(12) United States Patent
Suh

(10) Patent No.: US 8,349,236 B2
(45) Date of Patent: Jan. 8, 2013

(54) METHOD OF PREPARING A POLYETHYLENE MICROPOROUS FILM FOR A RECHARGEABLE BATTERY SEPARATOR

(75) Inventor: Chang Ho Suh, Buk-gu (KR)

(73) Assignee: Toray Advanced Materials Korea Inc., Gumi-Si (KR)

( * ) Notice: Subject to any disclaimer, the term of this patent is extended or adjusted under 35 U.S.C. 154(b) by 0 days.

(21) Appl. No.: 12/688,469

(22) Filed: Jan. 15, 2010

(65) Prior Publication Data

US 2010/0155982 A1 Jun. 24, 2010

Related U.S. Application Data

(62) Division of application No. 11/303,144, filed on Dec. 16, 2005.

(30) Foreign Application Priority Data

Dec. 23, 2004 (KR) ................................ 2004-110928
Jan. 12, 2005 (KR) .................................. 2005-02932

(51) Int. Cl.
*B29C 47/06* (2006.01)
(52) U.S. Cl. .............................. 264/173.14; 264/173.11
(58) Field of Classification Search ............. 264/173.15, 264/173.14, 173.11
See application file for complete search history.

(56) References Cited

U.S. PATENT DOCUMENTS 5,922,492 A * 7/1999 Takita et al. .................. 429/249
2002/0160268 A1* 10/2002 Yamaguchi et al. .......... 429/254

FOREIGN PATENT DOCUMENTS

| JP | 60242035 | 12/1985 |
|---|---|---|
| JP | 61195132 | 8/1986 |
| JP | 61195133 | 8/1986 |
| JP | 63039602 | 2/1988 |
| JP | 63273651 | 11/1988 |
| JP | 2094356 | 4/1990 |
| JP | 2126761 U | 10/1990 |
| JP | 2132327 U | 11/1990 |
| JP | 4212265 | 8/1992 |
| JP | 5021050 | 1/1993 |
| JP | 5025305 | 2/1993 |
| JP | 6212006 | 8/1994 |
| JP | 6325747 | 11/1994 |
| JP | 7105928 | 4/1995 |
| JP | 8064194 | 3/1996 |
| JP | 8138643 | 5/1996 |
| JP | 9087413 | 3/1997 |
| JP | 2002226639 A * | 8/2002 |

OTHER PUBLICATIONS

Murate et al., "Porous composite film and separator for battery using film", JP 2001-162741 machine translation, Jun. 2001.*
Kondo et al. JP 2002-226639A, "Microporous film useful as separator for lithium primary battery, secondary batter, lithium ion cell or lithium polymer cell" Derwent abstract, Aug. 2002.*
Osswald, Tim, "Polymer Processing Fundamentals", Jan. 1998, Hanser Publishing, p. 70 and 72.*

* cited by examiner

*Primary Examiner* — Galen Hauth
(74) *Attorney, Agent, or Firm* — K&L Gates LLP

(57) ABSTRACT

Disclosed are a polyethylene microporous film and a method of preparing the same. The polyethylene microporous film, which has a laminated structure comprising B layer/A layer/B layer, prepared by melt-mixing a polyethylene and an aliphatic hydrocarbon solvent together at controlled mixing ratios to separately form an A layer and a B layer having different porosities, and then coextruding the A and B layers, thus exhibiting excellent mechanical properties, such as strength and elongation, and high-temperature stability. Therefore, the polyethylene microporous film is suitable for use in a rechargeable battery separator.

6 Claims, 1 Drawing Sheet

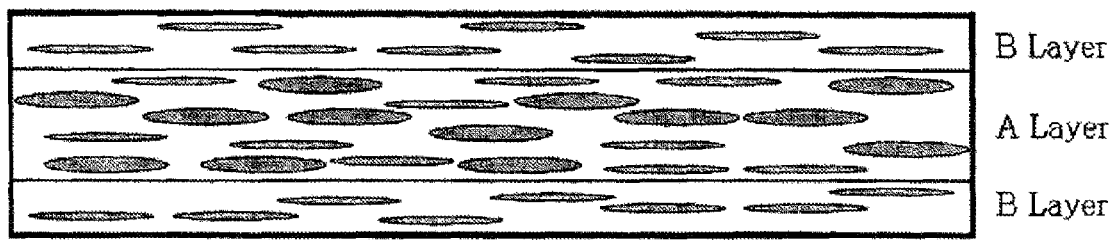

METHOD OF PREPARING A POLYETHYLENE MICROPOROUS FILM FOR A RECHARGEABLE BATTERY SEPARATOR

CROSS REFERENCES TO RELATED APPLICATIONS

The present application is a divisional of U.S. patent application Ser. No. 11/303,144, filed on Dec. 16, 2005 which claims priority to Korean Patent Application No. 2004-110928 filed in the Korean Patent Office on Dec. 23, 2004, Korean Patent Application No. 2005-02932 filed in the Korean Patent Office on Jan. 12, 2005, the entire contents of which being incorporated herein by reference.

BACKGROUND

The present invention relates a polyethylene microporous film for a rechargeable battery separator and a method of preparing the same, more particularly, the present invention relates the polyethylene microporous film, which has a laminated structure comprising B layer/A layer/B layer, formed by melt-mixing with a polyethylene and an aliphatic hydrocarbon solvent together at controlled mixing ratios to separately form an A layer and a B layer having different porosities, and then coextruding the A and B layers, thus exhibiting excellent mechanical properties, such as strength and elongation, and high-temperature stability, and the method of preparing such a polyethylene microporous film.

As various portable apparatuses, including mobile phones, notebook PCs, portable videos, PDAs, or portable multimedia players, have trended toward small sizes and light weights, rechargeable battery markets have gradually increased. A rechargeable battery is a chemical cell, which can be semi-permanently used through continuous repetitive charges and discharges using an electrochemical reaction, and has been realized as a lead storage battery, a nickel cadmium battery, a nickel hydrogen metal battery, a lithium ion battery, a lithium ion polymer battery, etc. In particular, of these batteries, a lithium ion battery and a lithium ion polymer battery, each of which has high voltage and excellent energy density properties, lead the rechargeable battery markets.

A lithium rechargeable battery comprises an anode, a cathode and a separator interposed between the anode and the cathode so as not to physically contact them. The separator for a lithium ion battery must have mechanical strength to endure a high-speed winding process upon manufacture of a battery, be chemically stable in an electrolyte, and have high-temperature stability to prevent the generation of short circuits and overcharge. As well, high capacity, excellent battery properties, stability and high productivity have been required in recent years.

Presently, as a separator for a lithium ion battery, a polyethylene microporous film is typically used. When the polyethylene microporous film is biaxially stretched, it has superior mechanical strength and remains chemically stable. In this way, efforts to improve properties required for the use of the polyethylene microporous film as a separator for a lithium ion battery have been thoroughly conducted.

In this regard, Japanese Patent No. 1848017 discloses a method of preparing a polyethylene microporous film, which comprises dissolving polyethylene having average weight molecular weight (Mw) ranging from 500,000 to 1,500,000 in a solvent using heat to prepare a solution, forming the solution into a gel sheet, removing the solvent from the gel sheet so that the solvent is present in the gel sheet in a proportion of 10-80 wt %, heat-stretching the gel sheet, and then removing residual solvent. Japanese Patent No. 2126761 discloses a polyethylene microporous film, prepared using polyethylene having an Mw of 500,000 or more.

In addition, Japanese Patent No. 1759736 or 1918760 discloses an ultrahigh molecular weight α-olefin polymer microporous film and a method of preparing the same, the method comprising preparing a solution of α-olefin polymer having an Mw of 500,000 or more into a gel body, removing at least 10 wt % of solvent from the gel body so that the amount of the α-olefin polymer in the gel body is 10~90 wt %, stretching the gel body at a temperature further increased to 10° C. higher than the melting point of the a-olefin polymer or lower, and then removing residual solvent. In addition, Japanese Patent No. 1948121 discloses a polyethylene microporous film, prepared by forming a solution of polyethylene having an Mw of 500,000 or more into a gel body, removing the solvent from the gel body so that the solvent is present in the gel body in a proportion of 80~95 wt %, uniaxially stretching the gel body at least twofold thus causing the magnification area thereof to be increased by at least ten times at 120° C. or less, and then removing residual solvent. In addition, Japanese Patent No. 1866164 discloses a method of preparing a polyolefin microporous film, comprising loading a solution containing ultrahigh molecular weight polyolefin having an Mw of 500,000 or more into a die, extruding the solution from the die while quenching it to 90° C. or less at a cooling rate of 50° C./min to form a gel body, removing at least 10 wt % of solvent from the gel body so that the amount of ultrahigh molecular weight polyolefin in the gel body is 10~90 wt %, stretching the gel body at a temperature further increased to 10° C. higher than the melting point of ultrahigh molecular weight polyolefin or lower, and then removing residual solvent.

Further, Japanese Patent No. 2132327 discloses a polyolefin microporous film having a porosity of 35~95%, an average pore diameter of 0.001~0.2 μm and a fracture strength of 0.2 kg or more at a width of 15 mm, prepared using a polyolefin composition including 1 wt % or more of ultrahigh molecular weight polyolefin having an Mw of 700,000 or more, and a ratio of average weight molecular weight/number average molecular weight (Mw/Mn) of 10~300.

Further, Japanese Patent No. 2657434 discloses a polyethylene microporous film and a method of preparing the same, the method comprising mixing 10~50 wt % of a composition, including 1~69 wt % of ultrahigh molecular weight polyethylene having an Mw of 700,000 or more, 98~1 wt % of high density polyethylene, and 1~30 wt % of low density polyethylene, in which an Mw/Mn ratio of the component containing ultrahigh molecular weight polyethylene and high density polyethylene is 10~300, with 50~90 wt % of a solvent to prepare a solution, extruding the solution from a die on a cooling roll to form a gel composition, and then stretching the gel composition at a temperature further increased to 10° C. higher than the melting point of the polyethylene composition or lower. As such, the polyethylene microporous film has a thickness of 0.1~50 μm, a porosity of 35~95%, an average pore diameter of 0.001~1 μm, tensile fracture strength of 200 kg/cm² or more, and impermeability at temperatures less than 135° C.

Also, Japanese Patent No. 3351940 discloses a polyolefin microporous film for a separator of a lithium ion battery, the film being prepared using a solution comprising 5~50 wt % of polyolefin, having an Mw ranging from 500,000 to 2,500,000 and an Mw/Mn ratio less than 10, and 95~50 wt % of a solvent.

In addition, Japanese Patent No. 2794179 discloses a polyethylene microporous film, prepared using high density polyethylene having an Mw ranging from 400,000 to 2,000,000 and an Mw/Mn ratio of 25 or less, and Japanese Patent No. 2961387 discloses a polyethylene microporous film, prepared using polyethylene having a viscosity average molecular weight ranging from 160,000 to 2,000,000, and Japanese Patent No. 3121047 discloses a microporous film having a three-dimensional network structure, comprising at least 30 wt % of ultrahigh molecular weight polyethylene having a viscosity average molecular weight of 2,000,000 or more based on the amount of microporous film. Additionally, various techniques are reported to control the properties of a polyethylene microporous film by adjusting the molecular weight and the amount of ultrahigh molecular weight polyethylene having an Mw of 1,000,000 or more [Japanese Patent Nos. 3258737, 3333287, 3497569, and 3486785], in which the polyethylene microporous film has a monolayer structure.

On the other hand, Japanese Patent No. 3195120 discloses a microporous film having a vein-shaped open pore structure comprising microfibrils, having a porosity of 30~70%, tensile strength of 1,000 kg/cm$^2$ or more and an average micropore diameter of 0.1~3 μm, prepared using high molecular weight polyethylene having a limiting viscosity [η] of 5 dl/g or more.

Korean Patent No. 371390 discloses a separator having a multi-layered structure, formed by laminating a plurality of polymer layers including a) a polypropylene layer, b) a polyethylene layer, and c) a tie layer, including polypropylene having an electrophilic functional group and polyethylene having a nucleophilic functional group, which is chemically bonded therewith.

Korean Patent No. 409019 discloses a multi-layered microporous film, comprising a) a support layer of polymer film, having a pore size of 0.001~100 μm and a thickness of 1~50 μm, and b) a shutdown layer formed on either one or both surfaces of the support layer, including a polymer having a melting point 40~75° C. lower than that of the polymer of the support layer, and having a pore size of 0.001~100 μm and a thickness of 0.01~20 μm, and a method of preparing such a microporous film.

In addition, Korean Patent No. 263919 discloses a microporous laminated film, which comprises a first polymer layer, including a polyethylene copolymer, and a second polymer layer, including a polypropylene copolymer and formed on at least one surface of the first polymer layer, and a method of preparing such a film. As such, the polyethylene copolymer results from copolymerization of polyethylene, including 10 wt % or less of polyethylene having a molecular weight of 1,000,000 or more and 60 wt % or less of polyethylene having a molecular weight of 10,000 or less, and any one or more selected from the group consisting of methylpentene, propylene, butene, pentene, hexene, and octene. The polypropylene copolymer is obtained by copolymerzing polypropylene, including 30 wt % or less of polypropylene having a molecular weight of 1,000,000 or more and 40 wt % or less of polypropylene having a molecular weight of 10,000 or less, and any one or more selected from the group consisting of methylpentene, propylene, butene, pentene, hexene, and octane.

In addition, Korean Patent Laid-open Publication No. 2000-51312 discloses a polypropylene microporous film for a battery separator, comprising 25~55 wt % of a polypropylene homopolymer having a melt flow index of 0.1~2.0 g/10 min, 3~30 wt % of polypropylene terpolymer having a melt flow index of 3~10 g/10 min, 30~70 wt % of paraffin oil, and 0.05~0.2 wt % of an antioxidant. Also, Korean Patent Laid-open Publication No. 2000-51313 discloses a polyethylene microporous film for a battery separator, comprising 20~40 wt % of high density polyethylene having a melt flow index of 0.2~0.5 g/10 min and a density of 0.960~0.969 g/cm$^3$, 4~20 wt % of high density polyethylene having a melt flow index of 0.02~0.1 g/10 min and a density of 0.950~0.958 g/cm$^3$, 40~70 wt % of paraffin oil, 5~15 wt % of DOP plasticizer, 0.1~0.5 wt % of a nucleation agent, and 0.1~0.5 wt % of an antioxidant. However, a plurality of separators for lithium ion rechargeable batteries, which is conventionally used, has not yet overcome difficulties in being manufactured into a thin film due to decreasing mechanical strength when permeability is increased, or due to decreasing permeability when mechanical strength is increased, from the point of view of the physical properties of the microporous film.

As mentioned above, almost all of the microporous films are mainly composed of a polyethylene. Hence, when current is drastically increased due to external or internal short circuits, the internal temperature of the battery drastically increases. Eventually, the microporous film of the battery may become deformed, and thus the stability of the battery is difficult to maintain. To overcome such problems, methods of preparing a microporous film comprising a polyethylene layer and a polypropylene layer laminated thereon or of variously coating the surface of the microporous film have been reported. However, these methods are disadvantageous because additional processes are required, causing other problems. That is, when the polypropylene layer is laminated by a dry process, film properties may be degraded or become non-uniform. Likewise, the coating process may cause problems with the stability of a battery, on account of the possibility of contamination. Therefore, a polyethylene film for a separator having higher stability is urgently required.

SUMMARY

Leading to the present invention, intensive and thorough research into a polyethylene film for a rechargeable battery separator having higher stability, carried out by the present inventors aiming to avoid the problems encountered in the related art, resulted in the finding that a polyethylene and an aliphatic hydrocarbon solvent may be melt-mixed together at controlled mixing ratios, to separately form an A layer and a B layer having different porosities, after which the A and B layers are coextruded, thereby preparing a polyethylene microporous film having a laminated structure comprising B layer/A layer/B layer, and in particular, when the A layer may further contain a thermoplastic resin incompatible with the polyethylene, pores may be additionally formed during a stretching process, thereby preparing a polyethylene microporous film having a laminated structure comprising B layer/A layer/B layer, which is advantageous because the state of the pores is desirably designed, porosity is increased, and permeability and mechanical strength are also improved.

Therefore, an object of the present invention is to provide a polyethylene microporous film for a rechargeable battery separator, which is imparted with a laminated structure comprising B layer/A layer/B layer by melt-mixing a polyethylene with an aliphatic hydrocarbon solvent at controlled mixing ratios, to separately form an A layer and a B layer having different porosities, and then coextruding the A and B layers.

Another object of the present invention is to provide a method of preparing such a polyethylene microporous film.

In order to accomplish the above objects, the present invention provides a polyethylene microporous film for a rechargeable battery separator, comprising an A layer formed by melt-mixing 20~40 wt % of a polyethylene with 60~80 wt % of an aliphatic hydrocarbon solvent; and B layers formed by melt-mixing 45~65 wt % of a polyethylene with 35~55 wt % of an aliphatic hydrocarbon solvent, which are laminated on both surfaces of the A layer, in which the A layer and B layers are coextruded to form a laminated structure comprising B layer/A layer/B layer.

In addition, the present invention provides a polyethylene microporous film for a rechargeable battery separator, comprising an A layer formed by melt-mixing 12.8~64.9 wt % of a polyethylene, 0.1~7.2 wt % of a thermoplastic resin incompatible with the polyethylene, and 35~80 wt % of an aliphatic hydrocarbon solvent; and B layers formed by melt-mixing 20~65 wt % of a polyethylene with 35~80 wt % of an aliphatic hydrocarbon solvent, which are laminated on both surfaces of the A layer, in which the A layer and B layers are coextruded to form a laminated structure comprising B layer/A layer/B layer. As such, the polyethylene microporous film has a first melting temperature of 125~145° C., and a second melting temperature of 175~235° C.

In the polyethylene microporous film, the polyethylene may be selected from the group consisting of high density polyethylene having an Mw ranging from 100,000 to 500,000, ultrahigh molecular weight polyethylene having an Mw ranging from 1,000,000 to 5,000,000, and a mixture thereof.

In this case, the mixture may comprise 60~80 wt % of high density polyethylene having an Mw of 100,000-500,000, and 20~40 wt % of ultrahigh molecular weight polyethylene having an Mw of 1,000,000~5,000,000.

The polyethylene may have a melt index of 1 g/10 min or less.

The thermoplastic resin incompatible with the polyethylene may be, for example, copolyester or nylon 6.

The aliphatic hydrocarbon solvent may be any one selected from the group consisting of nonane, decane, undecane, dodecane, and liquid paraffin oil.

The polyethylene microporous film for a rechargeable battery separator may have a thickness of 3~50 μm, in which the A layer may preferably be 1~20 μm thick and the B layer may preferably be 1~10 μm thick.

Further, the present invention provides a method of preparing a polyethylene microporous film for a rechargeable battery separator, the method comprising melt-mixing 20~40 wt % of a polyethylene with 60~80 wt % of an aliphatic hydrocarbon solvent to form an A layer, melt-mixing 45~65 wt % of a polyethylene with 35~55 wt % of an aliphatic hydrocarbon solvent to form B layers, coextruding the A layer and B layers to laminate B layers on both surfaces of the A layer, and then cooling the coextruded layers, to form a gel composition having a laminated structure comprising B layer/A layer/B layer; biaxially stretching the gel composition, to prepare a film; extracting the aliphatic hydrocarbon solvent from the A layer and B layers of the film using an organic solvent to remove the aliphatic hydrocarbon solvent, to prepare a microporous film; and heat-treating the microporous film at a temperature not higher than the melting temperature of the polyethylene.

In addition, the present invention provides a method of preparing a polyethylene microporous film for a rechargeable battery separator, the method comprising melt-mixing with 12.8~64.9 wt % of a polyethylene, 0.1~7.2 wt % of a thermoplastic incompatible with the polyethylene, and 35~80 wt % of an aliphatic hydrocarbon solvent to form an A layer, melt-mixing 20~65 wt % of a polyethylene with 35~80 wt % of an aliphatic hydrocarbon solvent to form B layers, coextruding the A layer and B layers to laminate B layers on both surfaces of the A layer, and then cooling the coextruded layers, to form a gel composition having a laminated structure comprising B layer/A layer/B layer; biaxially stretching the gel composition, to prepare a film; extracting the aliphatic hydrocarbon solvent from the A layer and B layers of the film using an organic solvent to remove the aliphatic hydrocarbon solvent, to prepare a microporous film; and heat-treating the microporous film at a temperature not higher than the melting temperature of the polyethylene.

In the method of preparing the polyethylene microporous film, the biaxial stretching process is conducted at a ratio ranging from 4×4 to 8×8 at 105~125° C.

Additional features and advantages are described herein, and will be apparent from, the following Detailed Description and the figures.

BRIEF DESCRIPTION OF THE FIGURES

FIG. 1 is a sectional view showing the structure of a polyethylene microporous film for a rechargeable battery separator of the present invention.

DETAILED DESCRIPTION

Hereinafter, a detailed description will be given of the present invention.

The present invention provides a polyethylene microporous film for a rechargeable battery separator, which has a laminated structure comprising B layer/A layer/B layer, obtained by melt-mixing with a polyethylene and an aliphatic hydrocarbon solvent at controlled mixing ratios, to separately form an A layer and a B layer having different porosities, after which the A and B layers are coextruded.

According to a first embodiment of the present invention, a polyethylene microporous film for a rechargeable battery separator is provided, which comprises an A layer formed by melt-mixing 20~40 wt % of a polyethylene with 60~80 wt % of an aliphatic hydrocarbon solvent, and B layers formed by melt-mixing 45~65 wt % of a polyethylene with 35~55 wt % of an aliphatic hydrocarbon solvent, which are laminated on both surfaces of the A layer, in which the A layer and B layers are coextruded to form a laminated structure comprising B layer/A layer/B layer. Also, a method of preparing such a polyethylene microporous film is provided.

In addition, according to a second embodiment of the present invention, a polyethylene microporous film for a rechargeable battery separator is provided, which comprises an A layer formed by melt-mixing 12.8~64.9 wt % of a polyethylene, 0.1~7.2 wt % of a thermoplastic resin incompatible with the polyethylene, and 35~80 wt % of an aliphatic hydrocarbon solvent, and B layers formed by melt-mixing 20~65 wt % of a polyethylene with 35~80 wt % of an aliphatic hydrocarbon solvent, which are laminated on both surfaces of the A layer, in which the A layer and B layers are coextruded to form a laminated structure comprising B layer/A layer/B layer. Also, a method of preparing such a polyethylene microporous film is provided.

The polyethylene used in each of the polyethylene microporous films, according to the first and second embodiments of the present invention, is not particularly limited as long as it is high density polyethylene suitable for use in a rechargeable battery separator. Preferably, high density polyethylene, having an Mw ranging from 100,000 to 500,000, or an ultrahigh molecular weight polyethylene, having an Mw of 1,000,000 or more, and preferably, of 1,000,000~5,000,000, is used alone or in mixtures thereof. More preferably, high density polyethylene having an Mw of 200,000~400,000 is used. In the present invention, for comparison under the same conditions, high density polyethylene having an Mw of 400, 000 is used, but ultrahigh molecular weight polyethylene having an Mw more than 400,000 or high density polyethylene having an Mw less than 400,000 may be used. If the Mw is less than 100,000, mechanical properties are decreased. On the other hand, if the Mw exceeds 500,000, process efficiency may be decreased. In the case where the mixture of high density polyethylene and ultrahigh molecular weight polyethylene is used, the mixture comprises 60~80 wt % of high density polyethylene having an Mw ranging from 100,000 to 500,000 and 20~40 wt % of ultrahigh molecular weight polyethylene having an Mw of 1,000,000~5,000,000.

In addition, an Mw/Mn ratio of the polyethylene of the present invention, which is regarded as a parameter showing the uniformity of a molecular weight distribution, ranges from 4 to 10. If this ratio is less than 4, the polyethylene has low melt strength. Meanwhile, if the ratio exceeds 10, a low molecular weight component is cut during a stretching process, and thus, the resultant film may have its overall strength decreased. Further, the polyethylene has a melt index of 1 g/10 min or less.

In the second embodiment of the present invention, as the thermoplastic resin incompatible with the polyethylene, any resin may be used as long as it is a polymer resin having a melting temperature of 175~235° C. Preferably, copolyester or nylon 6 may be selectively used. Hence, an A layer (an internal layer) is formed by further including the thermoplastic resin having a melting temperature higher than that of the polyethylene. As such, since the thermoplastic resin functions to form pores during a stretching process and is not melted at high temperatures, the resultant polyethylene microporous film can have high-temperature stability. Thus, when overheated, the film is not melted, and thus the generation of short circuits may be retarded.

The aliphatic hydrocarbon solvent is used to dissolve the polyethylene in the presence of heat to form a gel composition, and preferably is any one selected from the group consisting of nonane, decane, undecane, dodecane, and liquid paraffin oil. More preferably, non-volatile liquid paraffin oil is used, to obtain a gel composition having a uniform solvent content.

In the solution comprising a polyethylene and a solvent, according to the first embodiment of the present invention, or the solution comprising a polyethylene, a thermoplastic resin incompatible with the polyethylene, and a solvent, according to the second embodiment, a solid content is preferably 20~65 wt %. As such, if the solid content is smaller than 20 wt %, a great amount of solvent should be used, and also, swelling and neck-in phenomena occur in a die lip when forming a sheet, and thus a large film is difficult to manufacture. On the other hand, when the solid content exceeds 65 wt %, porosity is decreased. In addition, to prevent the polyethylene from being decomposed by oxidation, the solution may include an antioxidant, if necessary. Although the film further including an antioxidant is exemplified in the present invention, the present invention is not limited thereto.

FIG. 1 is a sectional view showing the structure of a polyethylene microporous film for a rechargeable battery separator, prepared using the method of the present invention, in which the polyethylene microporous film has a laminated structure comprising B layer/A layer/B layer.

The polyethylene microporous film for a rechargeable battery separator, according to the first and second embodiments of the present invention, has a thickness of 3~50 μm, and preferably of 3~30 μm. When the microporous film is thinner than 3 μm, the mechanical strength of the film becomes insufficient. On the other hand, when the film is thicker than 50 μm, limitations are imposed on reducing the size of the battery and decreasing the weight thereof.

More specifically, the A layer is preferably 1~20 μm, and the B layer is preferably 1~10 μm.

According to the first embodiment of the present invention, the polyethylene microporous film having a laminated structure comprising three layers of B layer/A layer/B layer has a porosity of 20~60%, and preferably of 30~50%. If porosity is less than 20%, permeability becomes insufficient. Meanwhile, a porosity exceeding 60% leads to insufficient mechanical strength.

In addition, in the polyethylene microporous film having a laminated structure comprising three layers of B layer/A layer/B layer, according to the second embodiment of the present invention, the A layer (an internal layer) further includes a thermoplastic resin, which has a melting temperature higher than that of the polyethylene and functions to form pores during stretching process of the film, thus assuring high-temperature stability. Therefore, the A layer as an internal layer functions to increase a meltdown temperature, while the B layer as an external layer functions to decrease a shutdown temperature. That is, small pores in the B layer as an external layer act to shorten a shutdown time, and the incompatible resin in the A layer as an internal layer acts to delay a meltdown time. The microporous film resists melting for a long time upon overheating, resulting in the retardation of the generation of short circuits.

Accordingly, the polyethylene microporous film according to the second embodiment of the present invention has a porosity of 25~95%, and preferably of 30~90%. Porosity less than 25% leads to insufficient permeability, whereas porosity exceeding 95% leads to insufficient mechanical strength. Especially, the pores can be formed during a stretching process due to the thermoplastic resin used along with the polyethylene, as well as during a typical formation process of micropores due to a solvent, thereby increasing the porosity of the polyethylene microporous film of the present invention.

Further, the polyethylene microporous film according to the second embodiment has a first melting temperature of 125~145° C. and a second melting temperature of 175~235° C., thus exhibiting high-temperature stability.

Since the porosity, which represents the degree of pore formation, is affected by the conditions of an extraction process, it was assayed as a numerical value obtained by removing the plasticizer through extraction using methylene chloride at room temperature in a suppressed state.

According to the polyethylene microporous film, according to the first and second embodiments of the present invention, has gas permeability of 10~4,000 sec, and preferably, of 50~1,000 sec. As such, if gas permeability is less than 10 sec, pore diameter is too large. If gas permeability exceeds 4,000 sec, permeability is insufficient.

In addition, the polyethylene microporous film, according to the first and second embodiments of the present invention, has a pore diameter of 0.003~0.3 μm, and preferably of 0.01~0.1 μm. When a pore diameter is smaller than 0.003 μm, permeability becomes insufficient. Meanwhile, when a pore diameter exceeds 0.3 μm, the interruption of current flow due to melt effects occurs late, and short circuits may be generated by precipitated resin crystals and decomposed active materials. Hence, the resultant microporous film becomes unsuitable for use in a battery.

In addition, the polyethylene microporous film for a rechargeable battery separator of the first and second embodiments of the present invention has a laminated structure, and thus exhibits mechanical properties superior to a polyethylene microporous film having a monolayer structure. As such, the polyethylene microporous film of the present invention has a strength of 10~20 kg/mm$^2$, and preferably, of 13.0~47.0 kg/mm$^2$, therefore exhibiting excellent mechanical properties.

Further, the present invention provides a method of preparing a polyethylene microporous film according to the first embodiment. Preferably, the method of the present invention comprises melt-mixing 20~40 wt % of a polyethylene with 60~80 wt % of an aliphatic hydrocarbon solvent to form an A layer, melt-mixing 45~65 wt % of a polyethylene with 35~55 wt % of an aliphatic hydrocarbon solvent to form B layers, coextruding the A layer and B layers to laminate B layers on both surfaces of the A layer, and then cooling the coextruded layers, to form a gel composition having a laminated structure comprising B layer/A layer/B layer; biaxially stretching the gel composition, to prepare a film; extracting the aliphatic hydrocarbon solvent from the A layer and B layers of the film using an organic solvent to remove it, to form a microporous film; and heat-treating the microporous film at a temperature not higher than the melting temperature of the polyethylene.

In addition, the present invention provides a method of preparing a polyethylene microporous film according to the second embodiment. Preferably, the method of the present invention comprises melt-mixing with 12.8~64.9 wt % of a polyethylene, 0.1~7.2 wt % of a thermoplastic resin incompatible with the polyethylene, and 35~80 wt % of an aliphatic hydrocarbon solvent together to form an A layer, melt-mixing with 20~65 wt % of a polyethylene and 35~80 wt % of an aliphatic hydrocarbon solvent to form B layers, coextruding the A layer and B layers to laminate B layers on both surfaces of the A layer, and then cooling the coextruded layers, to form a gel composition having a laminated structure comprising B layer/A layer/B layer; biaxially stretching the gel composition, to prepare a film; extracting the aliphatic hydrocarbon solvent from the A layer and B layers of the film using an organic solvent to remove it, to form a microporous film; and heat-treating the microporous film at a temperature not higher than the melting temperature of the polyethylene.

Specifically, in the formation process of the gel composition, according to the first embodiment, 20~40 wt % of the polyethylene and 60~80 wt % of the aliphatic hydrocarbon solvent are melt-mixed together at 160~220° C. and 150~250 rpm using a first intermeshing corotating twin-screw extruder to form an A layer. Separately, 45~65 wt % of the polyethylene and 35~55 wt % of the aliphatic hydrocarbon solvent are melt-mixed together at 160~220° C. and 150~250 rpm using a second intermeshing corotating twin-screw extruder, to form a B layer. As such, the extrusion temperature of the first and second twin-screw extruders is controlled, therefore resulting in uniform flow between layers.

According to the second embodiment, 12.8~64.9 wt % of the polyethylene, 0.1~7.2 wt % of the thermoplastic resin incompatible with the polyethylene, and 35~80 wt % of the aliphatic hydrocarbon solvent are melt-mixed together at 180~280° C. and 100~300 rpm using a first intermeshing corotating twin-screw extruder, to form an A layer. Separately, 20~65 wt % of the polyethylene and 35~80 wt % of the aliphatic hydrocarbon solvent are melt-mixed together at 180~280° C. and 100~300 rpm using a second intermeshing corotating twin-screw extruder, to form a B layer. As such, the control of the extrusion temperature of the first and second twin-screw extruders is important to obtain uniform flow between layers.

Then, the A and B layers are coextruded from a T die through feed blocks so that B layers are laminated on both surfaces of the A layer, to form a laminated structure comprising B layer/A layer/B layer, which is then cooled on a cooling roll, thus preparing a gel composition having a structure comprising B layer/A layer/B layer.

In the subsequent stretching process, the gel composition thus formed is stretched using sequential biaxial stretching or simultaneous biaxial stretching techniques. The stretching process is preferably conducted at a temperature not higher than the melting temperature of polyethylene, and more preferably, biaxial stretching is conducted at 105~125° C. and a ratio ranging from 4×4 to 8×8. In particular, the polyethylene microporous film for a rechargeable battery separator according to the second embodiment is advantageous because pores are formed during a stretching process, due to the use of the thermoplastic resin incompatible with the polyethylene. This process is carried out along with typical pore formation due to the solvent, resulting in increased porosity. In addition, since the thermoplastic resin has a high melting temperature, it does not melt even at high temperatures.

In the subsequent pore formation process, the aliphatic hydrocarbon solvent is removed from the biaxially stretched film using an organic solvent, therefore obtaining a microporous film. As such, when paraffin oil or dioctylphthalate is used as the aliphatic hydrocarbon solvent, an organic solvent such as methylene chloride or methylethylketone may be used. Further, in the case where the aliphatic hydrocarbon solvent, such as decaline having a low boiling point, is used, it may be sufficiently removed even if the film is heated and dried at a temperature not higher than the melting temperature of polyethylene, therefore obtaining a polyethylene microporous film.

In the subsequent heat treatment process, to improve permeability and dimensional stability, the polyethylene microporous film is treated at a temperature not higher than the melting temperature of polyethylene.

A better understanding of the present invention may be obtained in light of the following examples, which are set forth to illustrate, but are not to be construed to limit the present invention.

Preparation of Polyethylene Microporous Film According to the 1$^{st}$ Embodiment Example 1

A high density polyethylene having an Mw of 400,000 was dry mixed with 1 wt % Irganox (1010, available from Ciba Geigy Co. Ltd.), serving as an antioxidant, based on the amount of the high density polyethylene, to prepare a resin composition. Then, the resin composition was loaded into a first twin-screw extruder, and paraffin oil was injected into a side feed of the twin-screw extruder using a pump. The amounts of resin composition and paraffin oil added are shown in Table 1 below. Subsequently, an extrusion process was conducted at 180° C. and a screw rotation rate of 200 rpm, to form an A layer having a thickness of 2 μm.

In addition, a high density polyethylene having an Mw of 400,000 was dry mixed with 1 wt % Irganox antioxidant based on the amount of the high density polyethylene, to prepare a resin composition. Then, the resin composition was loaded into a second twin-screw extruder, and paraffin oil was injected into a side feed of the twin-screw extruder using a pump. The amounts of resin composition and paraffin oil added are shown in Table 1 below. Thereafter, an extrusion process was conducted at 200° C. and a screw rotation rate of 200 rpm, to form a B layer having a thickness of 1 μm.

Subsequently, the A and B layers were coextruded from a T-die through feed blocks, to form a laminated structure comprising three layers, that is, B layer/A layer/B layer, which was then cooled on a cooling roll, thereby forming a gel composition comprising B layer/A layer/B layer. The gel composition was loaded into a simultaneous biaxial stretching apparatus, stretched to a 5×5 ratio at 120° C., treated so that the paraffin oil was removed from the stretched gel composition through extraction using methylene chloride as an organic solvent, and then heat treated at 120° C., thus preparing a 4 µm thick microporous film having a laminated structure comprising B layer/A layer/B layer.

Examples 2~9

A 4 µm thick microporous film having a laminated structure comprising B layer/A layer/B layer was prepared in the same manner as in Example 1, with the exception that the amounts of resin composition and paraffin oil added were changed as shown in Table 1 below.

Comparative Example 1

A high density polyethylene having an Mw of 400,000 was dry mixed with 1 wt % Irganox antioxidant based on the amount of the high density polyethylene, to prepare a resin composition, which was then loaded into a twin-screw extruder, after which paraffin oil was injected into a side feed of the twin-screw extruder using a pump. The amounts of resin composition and paraffin oil added are shown in Table 1 below. Subsequently, an extrusion process was conducted at 190° C. and a screw rotation rate of 200 rpm, to obtain a predetermined layer.

The layer thus obtained was extruded from a T-die, and then cooled on a cooling roll, thereby forming a gel composition. The gel composition was loaded into a simultaneous biaxial stretching apparatus, stretched to a 5×5 ratio at 120° C., treated so that the paraffin oil was removed from the stretched gel composition through extraction using methylene chloride as an organic solvent, and then heat treated at 120° C., thus preparing a 4 µm thick microporous film having a monolayer structure.

Comparative Examples 2~3

A 4 µm thick microporous film having a monolayer structure was prepared in the same manner as in Comparative Example 1, with the exception that the amounts of resin composition and paraffin oil added were changed as shown in Table 1 below.

The processes and properties of the microporous films prepared in Examples 1~9 and Comparative Examples 1~3 are summarized in Table 1 below.

Example 10

A high density polyethylene having an Mw of 400,000 was dry mixed with 1 wt % Irganox antioxidant based on the amount of the high density polyethylene, to prepare a resin composition. Then, the resin composition was loaded into a first twin-screw extruder, and paraffin oil was injected into a side feed of the twin-screw extruder using a pump. The amounts of resin composition and paraffin oil added are shown in Table 2 below. Subsequently, an extrusion process was conducted at 180° C. and a screw rotation rate of 200 rpm, to form an A layer 4 µm thick.

In addition, a high density polyethylene having an Mw of 400,000 was dry mixed with 1 wt % Irganox antioxidant based on the amount of the high density polyethylene, to prepare a resin composition. Then, the resin composition was loaded into a second twin-screw extruder, and paraffin oil was injected into a side feed of the twin-screw extruder using a pump. The amounts of resin composition and paraffin oil added are shown in Table 2 below. Subsequently, an extrusion process was conducted at 200° C. and a screw rotation rate of 200 rpm, to form a B layer 2 µm thick.

Thereafter, the A and B layers were coextruded from a T-die through feed blocks, to form a laminated structure comprising three layers, that is, B layer/A layer/B layer, which was then cooled on a cooling roll, thereby forming a gel composition comprising B layer/A layer/B layer. The gel composition was loaded into a simultaneous biaxial stretching apparatus, stretched to a 6×6 ratio at 120° C., treated so that the paraffin oil was removed from the stretched gel composition through extraction using methylene chloride as an organic solvent, and then heat treated at 120° C., thus preparing an 8 µm thick microporous film having a laminated structure comprising B layer/A layer/B layer.

Examples 11~18

An 8 µm thick microporous film having a laminated structure comprising B layer/A layer/B layer was prepared in the same manner as in Example 10, with the exception that the amounts of resin composition and paraffin oil added were changed as shown in Table 2 below.

Comparative Example 4

A high density polyethylene having an Mw of 400,000 was dry mixed with 1 wt % Irganox antioxidant based on the amount of the high density polyethylene, to prepare a resin composition, which was then loaded into a twin-screw extruder, after which paraffin oil was injected into a side feed of the twin-screw extruder using a pump. The amounts of resin composition and paraffin oil added are shown in Table 2 below. Subsequently, an extrusion process was conducted at 190° C. and a screw rotation rate of 200 rpm, to obtain a predetermined layer.

The layer thus obtained was extruded from a T-die, and then cooled on a cooling roll, thereby forming a gel composition. The gel composition was loaded into a simultaneous biaxial stretching apparatus, stretched to a 6×6 ratio at 120° C., treated so that the paraffin oil was removed from the stretched gel composition through extraction using methylene chloride as an organic solvent, and then heat treated at 120° C., thus preparing an 8 µm thick microporous film having a monolayer structure.

Comparative Examples 5~6

An 8 µm thick microporous film having a monolayer structure was prepared in the same manner as in Comparative Example 4, with the exception that the amounts of resin composition and paraffin oil added were changed as shown in Table 2 below.

The processes and properties of the microporous films prepared in Examples 10~18 and Comparative Examples 4~6 are 5 summarized in Table 2 below.

Example 19

A high density polyethylene having an Mw of 400,000 was dry mixed with 1 wt % Irganox antioxidant based on the amount of the high density polyethylene to prepare a resin composition. Then, the resin composition was loaded into a first twin-screw extruder, and paraffin oil was injected into a side feed of the twin-screw extruder using a pump. The amounts of resin composition and paraffin oil added are shown in Table 3 below. Subsequently, an extrusion process was conducted at 180° C. and a screw rotation rate of 200 rpm, to form an A layer 6 μm thick.

In addition, a high density polyethylene having an Mw of 400,000 was dry mixed with 1 wt % Irganox antioxidant based on the amount of the high density polyethylene, to prepare a resin composition. Then, the resin composition was loaded into a second twin-screw extruder, and paraffin oil was injected into a side feed of the twin-screw extruder using a pump. The amounts of resin composition and paraffin oil added are shown in Table 3 below. Subsequently, an extrusion process was conducted at 200° C. and a screw rotation rate of 200 rpm, to form a B layer 3 μm thick.

Thereafter, the A and B layers were coextruded from a T-die through feed blocks, to form a laminated structure comprising three layers, that is, B layer/A layer/B layer, which was then cooled on a cooling roll, thereby forming a gel composition comprising B layer/A layer/B layer. The gel composition was loaded into a simultaneous biaxial stretching apparatus, stretched to a 7×7 ratio at 120° C., treated so that the paraffin oil was removed from the stretched gel composition through extraction using methylene chloride as an organic solvent, and then heat treated at 120° C., thus preparing a 12 μm thick microporous film having a laminated structure comprising B layer/A layer/B layer.

Examples 20~27

A 12 μm thick microporous film having a laminated structure comprising B layer/A layer/B layer was prepared in the same manner as in Example 19, with the exception that the amounts of resin composition and paraffin oil added were changed as shown in Table 3 below.

Comparative Example 7

A high density polyethylene having an Mw of 400,000 was dry mixed with 1 wt % Irganox antioxidant based on the amount of the high density polyethylene to prepare a resin composition, which was then loaded into a twin-screw extruder, after which paraffin oil was injected into a side feed of the twin-screw extruder using a pump. The amounts of resin composition and paraffin oil added are shown in Table 3 below. Subsequently, an extrusion process was conducted at 190° C. and a screw rotation rate of 200 rpm, to obtain a predetermined layer.

The layer thus obtained was extruded from a T-die and cooled on a cooling roll, to form a gel composition. The gel composition was loaded into a simultaneous biaxial stretching apparatus, stretched to a 7×7 ratio at 120° C., treated so that the paraffin oil was removed from the stretched gel composition through extraction using methylene chloride as an organic solvent, and then heat treated at 120° C., thus preparing a 12 μm thick microporous film having a monolayer structure.

Comparative Examples 8~9

A 12 μm thick microporous film having a monolayer structure was prepared in the same manner as in Comparative Example 7, with the exception that the amounts of resin composition and paraffin oil added were changed as shown in Table 3 below.

The processes and properties of the microporous films prepared in Examples 19~27 and Comparative Examples 7~9 are summarized in Table 3 below.

Experimental Example 1

Measurement of Properties

Thickness of Microporous Film

The thickness of each of the polyethylene microporous films prepared in Examples 1~27 and Comparative Examples 1~9, according to the first embodiment of the present invention, was measured using a contact thickness gauge (MITU-TOYO). The results are given in Tables 1 to 3.

The thickness of each of the polyethylene microporous films of the present invention was confirmed to be 4 μm, 8 μm, and 12 μm. While measuring the thickness of the microporous film, the following porosity and mechanical properties were also measured.

Measurement of Porosity

A 5 cm×5 cm sample of each of the polyethylene microporous films prepared in Examples 1~27 and Comparative Examples 1~9, according to the first embodiment, was cut, and the volume and weight thereof were measured. The measured values were substituted into Equation 1 below, to calculate porosity (%). The results are given in Tables 1 to 3 below.

In Tables 1 to 3, total porosity is represented by a measured value, while partial porosity is difficult to measure in practice and is thus represented by a calculated value resulting from the total porosity varying with the content of oil.

$$\text{Porosity (\%)} = \left[\frac{\text{void volume, cm}^3}{\text{total film volume, cm}^3}\right] \times 100 \qquad \text{Equation 1}$$

Wherein a void volume is a total film volume (cm³)—film weight (g)/resin density (g/cm³), in which a resin density is 0.95 g/cm³.

Measurement of Mechanical Properties

Each of the polyethylene microporous films prepared in Examples 1~27 and Comparative Examples 1~9, according to the first embodiment, was measured for strength (kg/mm²) and elongation (%) using an ASTM D882 method. The results are given in Tables 1 to 3 below.

TABLE 1

| Ex. No. | Layer | Thick. (μm) | Amount (wt %) PE | Amount (wt %) Oil | Porosity (%) Part. | Porosity (%) Total | Strength (kg/mm²) MD/TD | Elongation (%) MD/TD | Structure |
|---|---|---|---|---|---|---|---|---|---|
| 1 | B | 1 | 62 | 38 | 23 | 28 | 16.3/16.5 | 143/141 | Multilayer |
|   | A | 2 | 37 | 63 | 33 |   |   |   |   |
|   | B | 1 | 62 | 38 | 23 |   |   |   |   |

TABLE 1-continued

| Ex. No. | Layer | Thick. (μm) | Amount (wt %) PE | Oil | Porosity (%) Part. | Total | Strength (kg/mm²) MD/TD | Elongation (%) MD/TD | Structure |
|---|---|---|---|---|---|---|---|---|---|
| 2 | B | 1 | 55 | 45 | 28 | 30 | 16.7/16.1 | 152/155 | Multilayer |
|  | A | 2 | 37 | 63 | 33 |  |  |  |  |
|  | B | 1 | 55 | 45 | 28 |  |  |  |  |
| 3 | B | 1 | 48 | 52 | 32 | 32 | 15.3/15.1 | 161/168 | Multilayer |
|  | A | 2 | 37 | 63 | 33 |  |  |  |  |
|  | B | 1 | 48 | 52 | 32 |  |  |  |  |
| 4 | B | 1 | 62 | 38 | 23 | 31 | 15.5/15.9 | 175/170 | Multilayer |
|  | A | 2 | 30 | 70 | 38 |  |  |  |  |
|  | B | 1 | 62 | 38 | 23 |  |  |  |  |
| 5 | B | 1 | 55 | 45 | 28 | 33 | 14.7/14.5 | 183/187 | Multilayer |
|  | A | 2 | 30 | 70 | 38 |  |  |  |  |
|  | B | 1 | 55 | 45 | 28 |  |  |  |  |
| 6 | B | 1 | 48 | 52 | 33 | 36 | 13.2/13.9 | 185/181 | Multilayer |
|  | A | 2 | 30 | 70 | 38 |  |  |  |  |
|  | B | 1 | 48 | 52 | 33 |  |  |  |  |
| 7 | B | 1 | 62 | 38 | 23 | 33 | 13.7/13.2 | 192/197 | Multilayer |
|  | A | 2 | 23 | 77 | 43 |  |  |  |  |
|  | B | 1 | 62 | 38 | 23 |  |  |  |  |
| 8 | B | 1 | 55 | 45 | 28 | 35 | 12.1/12.8 | 215/212 | Multilayer |
|  | A | 2 | 23 | 77 | 43 |  |  |  |  |
|  | B | 1 | 55 | 45 | 28 |  |  |  |  |
| 9 | B | 1 | 48 | 52 | 32 | 38 | 12.6/12.1 | 223/225 | Multilayer |
|  | A | 2 | 23 | 77 | 43 |  |  |  |  |
|  | B | 1 | 48 | 52 | 32 |  |  |  |  |
| C. 1 | — | 4 | 55 | 45 | — | 28 | 7.3/7.7 | 117/111 | Monolayer |
| C. 2 | — | 4 | 45 | 55 | — | 32 | 6.5/6.2 | 131/136 | Monolayer |
| C. 3 | — | 4 | 35 | 65 | — | 35 | 5.2/4.8 | 157/164 | Monolayer |

TABLE 2

| Ex. No. | Layer | Thick. (μm) | Amount (wt %) PE | Oil | Porosity (%) Part. | Total | Strength (kg/mm²) MD/TD | Elongation (%) MD/TD | Structure |
|---|---|---|---|---|---|---|---|---|---|
| 10 | B | 2 | 62 | 38 | 27 | 33 | 18.5/18.3 | 131/133 | Multilayer |
|  | A | 4 | 37 | 63 | 39 |  |  |  |  |
|  | B | 2 | 62 | 38 | 27 |  |  |  |  |
| 11 | B | 2 | 55 | 45 | 32 | 36 | 18.1/18.7 | 145/142 | Multilayer |
|  | A | 4 | 37 | 63 | 39 |  |  |  |  |
|  | B | 2 | 55 | 45 | 32 |  |  |  |  |
| 12 | B | 2 | 48 | 52 | 37 | 38 | 17.4/17.2 | 152/159 | Multilayer |
|  | A | 4 | 37 | 63 | 39 |  |  |  |  |
|  | B | 2 | 48 | 52 | 37 |  |  |  |  |
| 13 | B | 2 | 62 | 38 | 27 | 35 | 17.6/17.9 | 166/161 | Multilayer |
|  | A | 4 | 30 | 70 | 44 |  |  |  |  |
|  | B | 2 | 62 | 38 | 27 |  |  |  |  |
| 14 | B | 2 | 55 | 45 | 32 | 38 | 16.5/16.7 | 177/173 | Multilayer |
|  | A | 4 | 30 | 70 | 44 |  |  |  |  |
|  | B | 2 | 55 | 45 | 32 |  |  |  |  |
| 15 | B | 2 | 48 | 52 | 37 | 41 | 15.9/15.2 | 171/175 | Multilayer |
|  | A | 4 | 30 | 70 | 44 |  |  |  |  |
|  | B | 2 | 48 | 52 | 37 |  |  |  |  |
| 16 | B | 2 | 62 | 38 | 27 | 38 | 15.8/15.3 | 183/188 | Multilayer |
|  | A | 4 | 23 | 77 | 49 |  |  |  |  |
|  | B | 2 | 62 | 38 | 27 |  |  |  |  |
| 17 | B | 2 | 55 | 45 | 32 | 40 | 14.2/14.9 | 206/203 | Multilayer |
|  | A | 4 | 23 | 77 | 49 |  |  |  |  |
|  | B | 2 | 55 | 45 | 32 |  |  |  |  |
| 18 | B | 2 | 48 | 52 | 37 | 43 | 14.6/14.1 | 213/215 | Multilayer |
|  | A | 4 | 23 | 77 | 49 |  |  |  |  |
|  | B | 2 | 48 | 52 | 37 |  |  |  |  |
| C. 4 | — | 8 | 55 | 45 | — | 32 | 11.7/11.3 | 121/127 | Monolayer |
| C. 5 | — | 8 | 45 | 55 | — | 37 | 10.6/10.3 | 142/147 | Monolayer |
| C. 6 | — | 8 | 35 | 65 | — | 41 | 9.8/9.2 | 164/177 | Monolayer |

TABLE 3

| Ex. No. | Layer | Thick. (μm) | Amount (wt %) PE | Amount (wt %) Oil | Porosity (%) Part. | Porosity (%) Total | Strength (kg/mm$^2$) MD/TD | Elongation (%) MD/TD | Structure |
|---|---|---|---|---|---|---|---|---|---|
| 19 | B | 3 | 62 | 38 | 31 | 38 | 16.3/16.5 | 145/149 | Multilayer |
|  | A | 6 | 37 | 63 | 45 |  |  |  |  |
|  | B | 3 | 62 | 38 | 31 |  |  |  |  |
| 20 | B | 3 | 55 | 45 | 36 | 41 | 16.7/16.1 | 153/151 | Multilayer |
|  | A | 6 | 37 | 63 | 45 |  |  |  |  |
|  | B | 3 | 55 | 45 | 36 |  |  |  |  |
| 21 | B | 3 | 48 | 52 | 41 | 43 | 15.3/15.1 | 163/168 | Multilayer |
|  | A | 6 | 37 | 63 | 45 |  |  |  |  |
|  | B | 3 | 48 | 52 | 41 |  |  |  |  |
| 22 | B | 3 | 62 | 38 | 31 | 40 | 15.5/15.9 | 170/179 | Multilayer |
|  | A | 6 | 30 | 70 | 50 |  |  |  |  |
|  | B | 3 | 62 | 38 | 31 |  |  |  |  |
| 23 | B | 3 | 55 | 45 | 36 | 43 | 14.7/14.5 | 184/188 | Multilayer |
|  | A | 6 | 30 | 70 | 50 |  |  |  |  |
|  | B | 3 | 55 | 45 | 36 |  |  |  |  |
| 24 | B | 3 | 48 | 52 | 41 | 45 | 13.2/13.9 | 189/180 | Multilayer |
|  | A | 6 | 30 | 70 | 50 |  |  |  |  |
|  | B | 3 | 48 | 52 | 41 |  |  |  |  |
| 25 | B | 3 | 62 | 38 | 31 | 43 | 13.7/13.2 | 193/197 | Multilayer |
|  | A | 6 | 23 | 77 | 55 |  |  |  |  |
|  | B | 3 | 62 | 38 | 31 |  |  |  |  |
| 26 | B | 3 | 55 | 45 | 36 | 46 | 12.1/12.8 | 211/219 | Multilayer |
|  | A | 6 | 23 | 77 | 55 |  |  |  |  |
|  | B | 3 | 55 | 45 | 36 |  |  |  |  |
| 27 | B | 3 | 48 | 52 | 41 | 48 | 12.6/12.1 | 233/238 | Multilayer |
|  | A | 6 | 23 | 77 | 55 |  |  |  |  |
|  | B | 3 | 48 | 52 | 41 |  |  |  |  |
| C. 7 | — | 12 | 55 | 45 | — | 36 | 13.7/13.3 | 141/151 | Monolayer |
| C. 8 | — | 12 | 45 | 55 | — | 41 | 12.6/12.3 | 162/167 | Monolayer |
| C. 9 | — | 12 | 35 | 65 | — | 47 | 11.8/11.2 | 184/186 | Monolayer |

As is apparent from Tables 1 to 3, the microporous films having a structure comprising B layer/A layer/B layer and thicknesses ranging from 4 to 12 μm, prepared in Examples of the present invention, had mechanical properties of strength and elongation superior to microporous films of Comparative Examples having a monolayer structure and same thicknesses.

Preparation of Polyethylene Microporous Film According to the 2$^{nd}$ Embodiment Example 28

A high density polyethylene (PE-1) having an Mw of 400,000 and a copolyester resin were dry mixed with 0.5 wt % Irganox (1010, available from Ciba Geigy Co. Ltd.), serving as an antioxidant, based on the amount of the high density polyethylene, to prepare a resin composition. Then, the resin composition was loaded into a first twin-screw extruder, and paraffin oil was injected into a side feed of the twin-screw extruder using a pump. The amounts of resin composition and paraffin oil added are shown in Table 4 below. Subsequently, an extrusion process was conducted at 240° C. and a screw rotation rate of 200 rpm, to form an A layer.

In addition, a high density polyethylene having an Mw of 400,000 was dry mixed with 1 wt % Irganox antioxidant based on the amount of the high density polyethylene, to prepare a resin composition. The resin composition was loaded into a second twin-screw extruder, and paraffin oil was injected into a side feed of the twin-screw extruder using a pump. The amounts of resin composition and paraffin oil added are shown in Table 4 below. Subsequently, an extrusion process was conducted at 240° C. and a screw rotation rate of 200 rpm, to form a B layer.

Thereafter, the A and B layers were coextruded from a T-die through feed blocks, to form a laminated structure comprising three layers, that is, B layer/A layer/B layer, which was then cooled on a cooling roll, thereby forming a gel composition comprising B layer/A layer/B layer. The gel composition was loaded into a simultaneous biaxial stretching apparatus, stretched to a 6×6 ratio at 120° C., treated so that the paraffin oil was removed from the stretched gel composition through extraction using methylene chloride as an organic solvent, and then heat treated at 120° C., thus preparing a 16 μm thick microporous film having a laminated structure comprising B layer/A layer/B layer.

Examples 29~30

A 16 μm thick microporous film having a laminated structure comprising B layer/A layer/B layer was prepared in the same manner as in Example 28, with the exception that the amounts of resin composition and paraffin oil added were changed as shown in Table 4 below.

Example 31

A high density polyethylene (PE-2) having an Mw of 300,000 and a copolyester resin were dry mixed with 0.5 wt % Irganox antioxidant based on the amount of the high density polyethylene, to prepare a resin composition, which was then loaded into a first twin-screw extruder, after which paraffin oil was injected into a side feed of the twin-screw extruder using a pump. Subsequently, an extrusion process was conducted at 240° C. and a screw rotation rate of 200 rpm, to form an A layer.

In addition, a high density polyethylene (PE-2) having an Mw of 300,000 was dry mixed with 0.5 wt % Irganox antioxidant based on the amount of the high density polyethylene, to prepare a resin composition, which was then loaded into a second twin-screw extruder, after which paraffin oil was injected into a side feed of the twin-screw extruder using a pump. Subsequently, an extrusion process was conducted at the same temperature and screw rotation rate mentioned above, to form a B layer.

Thereafter, the A and B layers were coextruded from a T-die through feed blocks, to form a laminated structure comprising three layers, that is, B layer/A layer/B layer, which was then cooled on a cooling roll, thereby forming a gel composition comprising B layer/A layer/B layer. The gel composition was loaded into a simultaneous biaxial stretching apparatus, stretched to a 7×7 ratio at 120° C., treated so that the paraffin oil was removed from the stretched gel composition through extraction using methylene chloride as an organic solvent, and then heat treated at 120° C., thus preparing a 16 μm thick microporous film having a laminated structure comprising B layer/A layer/B layer.

Examples 32~33

A 16 μm thick microporous film having a laminated structure comprising B layer/A layer/B layer was prepared in the same manner as in Example 31, with the exception that the amounts of resin composition and paraffin oil added were changed as shown in Table 4 below.

Example 34

A high density polyethylene (PE-3) having an Mw of 200,000, ultrahigh molecular weight polyethylene (PE-4) having an Mw of 2,000,000, and a copolyester resin were dry mixed with 0.5 wt % Irganox antioxidant based on the amount of the high density polyethylene, to prepare a resin composition, which was then loaded into a first twin-screw extruder, after which paraffin oil was injected into a side feed of the twin-screw extruder using a pump. Subsequently, an extrusion process was conducted at 240° C. and a screw rotation rate of 200 rpm, to form an A layer.

In addition, high density polyethylene (PE-3) having an Mw of 200,000 and ultrahigh molecular weight polyethylene (PE-4) having an Mw of 2,000,000 were dry mixed with 0.5 wt % Irganox antioxidant based on the amount of the high density polyethylene, to prepare a resin composition, which was then loaded into a second twin-screw extruder, after which paraffin oil was injected into a side feed of the twin-screw extruder using a pump. Subsequently, an extrusion process was conducted at the same extrusion temperature and screw rotation rate mentioned above, to form a B layer.

Thereafter, the A and B layers were coextruded from a T-die through feed blocks, to form a laminated structure comprising three layers, that is, B layer/A layer/B layer, which was then cooled on a cooling roll, thereby forming a gel composition comprising B layer/A layer/B layer. The gel composition was loaded into a simultaneous biaxial stretching apparatus, stretched to a 5×5 ratio at 120° C., treated so that the paraffin oil was removed from the stretched gel composition through extraction using methylene chloride as an organic solvent, and then heat treated at 120° C., thus preparing a 16 μm thick microporous film having a laminated structure comprising B layer/A layer/B layer.

Examples 35~36

A 16 μm thick microporous film having a laminated structure comprising B layer/A layer/B layer was prepared in the same manner as in Example 34, with the exception that the amounts of resin composition and paraffin oil added were changed as shown in Table 4 below.

TABLE 4

Preparation of Polyethylene Microporous Film

| Ex. No. | Thick. (μm) | Amount (wt %) PE-1 | PE-2 | PE-3 | PE-4 | Copolyester | Oil | Structure |
|---|---|---|---|---|---|---|---|---|
| 28 | 16 | 40 | — | — | — | — | 60 | Multilayer |
|  |  | 39.6 | — | — | — | 0.4 | 60 |  |
|  |  | 40 | — | — | — | — | 60 |  |
| 29 | 16 | 40 | — | — | — | — | 60 | Multilayer |
|  |  | 39 | — | — | — | 1 | 60 |  |
|  |  | 40 | — | — | — | — | 60 |  |
| 30 | 16 | 40 | — | — | — | — | 60 | Multilayer |
|  |  | 38 | — | — | — | 2 | 60 |  |
|  |  | 40 | — | — | — | — | 60 |  |
| 31 | 16 | — | 55 | — | — | — | 45 | Multilayer |
|  |  | — | 54.5 | — | — | 0.5 | 45 |  |
|  |  | — | 55 | — | — | — | 45 |  |
| 32 | 16 | — | 55 | — | — | — | 45 | Multilayer |
|  |  | — | 53.6 | — | — | 1.4 | 45 |  |
|  |  | — | 55 | — | — | — | 45 |  |
| 33 | 16 | — | 55 | — | — | — | 45 | Multilayer |
|  |  | — | 52.3 | — | — | 2.7 | 45 |  |
|  |  | — | 55 | — | — | — | 45 |  |
| 34 | 16 | — | — | 21 | 9 | — | 70 | Multilayer |
|  |  | — | — | 20.8 | 8.9 | 0.3 | 70 |  |
|  |  | — | — | 21 | 9 | — | 70 |  |
| 35 | 16 | — | — | 21 | 9 | — | 70 | Multilayer |
|  |  | — | — | 20.5 | 8.8 | 0.7 | 70 |  |
|  |  | — | — | 21 | 9 | — | 70 |  |
| 36 | 16 | — | — | 21 | 9 | — | 70 | Multilayer |
|  |  | — | — | 20.0 | 8.5 | 1.5 | 70 |  |
|  |  | — | — | 21 | 9 | — | 70 |  |

Example 37

A high density polyethylene (PE-1) having an Mw of 400,000 and nylon 6 were dry mixed with 0.5 wt % Irganox (1010, available from Ciba Geigy Co. Ltd.), serving as an antioxidant, based on the amount of the high density polyethylene, to prepare a resin composition. Then, the resin composition was loaded into a first twin-screw extruder, and paraffin oil was injected into a side feed of the twin-screw extruder using a pump. The amounts of resin composition and paraffin oil added are shown in Table 5 below. Subsequently, an extrusion process was conducted at 240° C. and a screw rotation rate of 200 rpm, to form an A layer.

In addition, a high density polyethylene having an Mw of 400,000 was dry mixed with 1 wt % Irganox antioxidant based on the amount of the high density polyethylene, to prepare a resin composition, which was then loaded into a second twin-screw extruder, after which paraffin oil was injected into a side feed of the twin-screw extruder using a pump. The amounts of resin composition and paraffin oil added are shown in Table 5 below. Subsequently, an extrusion process was conducted at 240° C. and a screw rotation rate of 200 rpm, to form a B layer.

Thereafter, the A and B layers were coextruded from a T-die through feed blocks, to form a laminated structure comprising three layers, that is, B layer/A layer/B layer, which was then cooled on a cooling roll, thereby forming a gel composition comprising B layer/A layer/B layer. The gel composition was loaded into a simultaneous biaxial stretching apparatus, stretched to a 6×6 ratio at 120° C., treated so that the paraffin oil was removed from the stretched gel composition through extraction using methylene chloride as an organic solvent, and then heat treated at 120° C., thus preparing a 16 μm thick microporous film having a laminated structure comprising B layer/A layer/B layer.

Examples 38~39

A 16 μm thick microporous film having a laminated structure comprising B layer/A layer/B layer was prepared in the same manner as in Example 37, with the exception that the amounts of resin composition and paraffin oil added were changed as shown in Table 5 below.

Example 40

High density polyethylene (PE-2) having an Mw of 300,000, and nylon 6 were dry mixed with 0.5 wt % Irganox antioxidant based on the amount of the high density polyethylene, to prepare a resin composition. Then, the resin composition was loaded into a first twin-screw extruder, and paraffin oil was injected into a side feed of the twin-screw extruder using a pump. Subsequently, an extrusion process was conducted at 240° C. and a screw rotation rate of 200 rpm, to form an A layer.

In addition, high density polyethylene (PE-2) having an Mw of 300,000 was dry mixed with 0.5 wt % Irganox antioxidant based on the amount of the high density polyethylene, to prepare a resin composition. Then, the resin composition was loaded into a second twin-screw extruder, and paraffin oil was injected into a side feed of the twin-screw extruder using a pump. Subsequently, an extrusion process was conducted at the same extrusion temperature and screw rotation rate mentioned above, to form a B layer. The amounts of addition of the resin composition and the paraffin oil are shown in Table 5 below.

Thereafter, the A and B layers were coextruded from a T-die through feed blocks, to form a laminated structure comprising three layers, that is, B layer/A layer/B layer, which was then cooled on a cooling roll, thereby forming a gel composition comprising B layer/A layer/B layer. The gel composition was loaded into a simultaneous biaxial stretching apparatus, stretched to a 7×7 ratio at 120° C., treated so that the paraffin oil was removed from the stretched gel composition through extraction using methylene chloride as an organic solvent, and then heat treated at 120° C., thus preparing a 16 μm thick microporous film having a laminated structure comprising B layer/A layer/B layer.

Examples 41~42

A 16 μm thick microporous film having a laminated structure comprising B layer/A layer/B layer was prepared in the same manner as in Example 40, with the exception that the amounts of resin composition and paraffin oil added were changed as shown in Table 5 below.

Example 43

High density polyethylene (PE-3) having an Mw of 200,000, ultrahigh molecular weight polyethylene (PE-4) having an Mw of 2,000,000, and a copolyester resin were dry mixed with 0.5 wt % Irganox antioxidant based on the amount of the high density polyethylene to obtain a resin composition. Then, the resin composition was loaded into a first twin-screw extruder, and paraffin oil was injected into a side feed of the twin-screw extruder using a pump. Subsequently, an extrusion process was conducted at 240° C. and a screw rotation rate of 200 rpm, to form an A layer.

In addition, high density polyethylene (PE-3) having an Mw of 200,000 and ultrahigh molecular weight polyethylene (PE-4) having an Mw of 2,000,000 were dry mixed with 0.5 wt % Irganox antioxidant based on the amount of the high density polyethylene, to obtain a resin composition. Then, the resin composition was loaded into a second twin-screw extruder, and paraffin oil was injected into a side feed of the twin-screw extruder using a pump. Subsequently, an extrusion process was conducted at the same extrusion temperature and screw rotation rate mentioned above, to form a B layer. The amounts of resin composition and paraffin oil added are shown in Table 5 below.

Thereafter, the A and B layers were coextruded from a T-die through feed blocks, to form a laminated structure comprising three layers, that is, B layer/A layer/B layer, which was then cooled on a cooling roll, thereby forming a gel composition comprising B layer/A layer/B layer. The gel composition was loaded into a simultaneous biaxial stretching apparatus, stretched to a 5×5 ratio at 120° C., treated so that the paraffin oil was removed from the stretched gel composition through extraction using methylene chloride as an organic solvent, and then heat treated at 120° C., thus preparing a 16 μm thick microporous film having a laminated structure comprising B layer/A layer/B layer.

Examples 44~45

A 16 μm thick microporous film having a laminated structure comprising B layer/A layer/B layer was prepared in the same manner as in Example 43, with the exception that the amounts of resin composition and paraffin oil added were changed as shown in Table 5 below.

TABLE 5

Preparation of Polyethylene Microporous Film

| Ex. No. | Thick. (μm) | PE-1 | PE-2 | PE-3 | PE-4 | Nylon 6 | Oil | Structure |
|---|---|---|---|---|---|---|---|---|
| 37 | 16 | 40 | — | — | — | — | 60 | Multilayer |
|  |  | 39.6 | — | — | — | 0.4 | 60 |  |
|  |  | 40 | — | — | — | — | 60 |  |
| 38 | 16 | 40 | — | — | — | — | 60 | Multilayer |
|  |  | 39 | — | — | — | 1 | 60 |  |
|  |  | 40 | — | — | — | — | 60 |  |
| 39 | 16 | 40 | — | — | — | — | 60 | Multilayer |
|  |  | 38 | — | — | — | 2 | 60 |  |
|  |  | 40 | — | — | — | — | 60 |  |
| 40 | 16 | — | 55 | — | — | — | 45 | Multilayer |
|  |  | — | 54.5 | — | — | 0.5 | 45 |  |
|  |  | — | 55 | — | — | — | 45 |  |
| 41 | 16 | — | 55 | — | — | — | 45 | Multilayer |
|  |  | — | 53.6 | — | — | 1.4 | 45 |  |
|  |  | — | 55 | — | — | — | 45 |  |
| 42 | 16 | — | 55 | — | — | — | 45 | Multilayer |
|  |  | — | 52.3 | — | — | 2.7 | 45 |  |
|  |  | — | 55 | — | — | — | 45 |  |
| 43 | 16 | — | — | 21 | 9 | — | 70 | Multilayer |
|  |  | — | — | 20.8 | 8.9 | 0.3 | 70 |  |
|  |  | — | — | 21 | 9 | — | 70 |  |
| 44 | 16 | — | — | 21 | 9 | — | 70 | Multilayer |
|  |  | — | — | 20.5 | 8.8 | 0.7 | 70 |  |
|  |  | — | — | 21 | 9 | — | 70 |  |
| 45 | 16 | — | — | 21 | 9 | — | 70 | Multilayer |
|  |  | — | — | 20.0 | 8.5 | 1.5 | 70 |  |
|  |  | — | — | 21 | 9 | — | 70 |  |

Comparative Example 10

A high density polyethylene (PE-1) having an Mw of 400,000 was dry mixed with 1 wt % Irganox antioxidant based on the amount of the high density polyethylene to obtain a resin composition. Then the resin composition was loaded into a twin-screw extruder, and paraffin oil was injected into a side feed of the twin-screw extruder using a pump. The amounts of resin composition and paraffin oil added are shown in Table 6 below. Subsequently, an extrusion process was conducted at 190° C. and a screw rotation rate of 200 rpm, to obtain a predetermined layer. The layer thus obtained was extruded from a T-die, and then cooled on a cooling roll, thereby forming a gel sheet. The sheet was stretched to a 6×6 ratio at 120° C. using a simultaneous biaxial stretching apparatus, treated so that the paraffin oil was removed from the stretched gel composition through extraction using methylene chloride as an organic solvent, and then heat treated at 120° C., thus preparing a 16 μm thick microporous film having a monolayer structure.

Comparative Example 11

A 16 μm thick microporous film having a monolayer structure was prepared in the same manner as in Comparative Example 10, with the exception that the amounts of resin composition and paraffin oil added were changed as shown in Table 6 below, and the stretching ratio was changed to 7×7.

Comparative Example 12

A 16 μm thick microporous film having a monolayer structure was prepared in the same manner as in Comparative Example 10, with the exception that the amounts of resin composition and paraffin oil added were changed as shown in Table 6 below, and the stretching ratio was changed to 5×5.

TABLE 6

Preparation of Polyethylene Microporous Film

| C. Ex. No. | Thick. (μm) | Amount (wt %) | | | | Oil | Structure |
|---|---|---|---|---|---|---|---|
| | | PE-1 | PE-2 | PE-3 | PE-4 | | |
| 10 | 16 | 40 | — | — | — | 60 | Monolayer |
| 11 | 16 | — | 55 | — | — | 45 | Monolayer |
| 12 | 16 | — | — | 21 | 9 | 70 | Monolayer |

Experimental Example 2

Measurement of Properties

Thickness of Microporous Film

The thickness of each of the polyethylene microporous films prepared in Examples 28~45 and Comparative Examples 10~12 according to the second embodiment of the present invention was measured using a contact thickness gauge (MITUTOYO). The results are given in Tables 7 to 9. The thickness of each of the polyethylene microporous films was confirmed to be 16 μm. While measuring the thickness of the microporous film, the following porosity and mechanical properties were also measured.

Measurement of Porosity

A 10 cm×10 cm sample of each of the polyethylene microporous films prepared in Examples 28~45 and Comparative Examples 10~12 according to the second embodiment was cut, and the volume and weight thereof were measured. The measured values were substituted into Equation 1, to calculate porosity (%). The results are given in Tables 7 to 9 below.

Measurement of Strength and Elongation

Each of the polyethylene microporous films prepared in Examples 28~45 and Comparative Examples 10~12 according to the second embodiment was measured for strength (kg/mm$^2$) and elongation (%) using an ASTM D882 method. The results are given in Tables 7 to 9 below.

TABLE 7

| Ex. No. | Porosity (%) | Strength (kg/mm$^2$) MD | Elongation (%) | | Melting Temp. (° C.) | |
|---|---|---|---|---|---|---|
| | | | PE-2 | PE-3 | PE-4 | 1$^{st}$ | 2$^{nd}$ |
| 28 | 43 | 14.2 | 13.8 | 163 | 172 | 138 | 221 |
| 29 | 46 | 13.2 | 14.2 | 175 | 184 | 138 | 221 |
| 30 | 51 | 13.5 | 13.1 | 181 | 192 | 139 | 223 |
| 31 | 40 | 13.7 | 14.5 | 79 | 80 | 138 | 222 |
| 32 | 44 | 15.1 | 14.1 | 85 | 90 | 138 | 222 |
| 33 | 48 | 13.1 | 13.3 | 89 | 102 | 139 | 223 |
| 34 | 41 | 16.3 | 13.1 | 142 | 240 | 136 | 222 |
| 35 | 46 | 15.6 | 13.3 | 158 | 231 | 135 | 221 |
| 36 | 51 | 15.8 | 13.5 | 168 | 257 | 138 | 223 |

TABLE 8

| Ex. No. | Porosity (%) | Strength (kg/mm$^2$) MD | Elongation (%) | | Melting Temp. (° C.) | |
|---|---|---|---|---|---|---|
| | | | PE-2 | PE-3 | PE-4 | 1$^{st}$ | 2$^{nd}$ |
| 37 | 42 | 14.6 | 13.4 | 161 | 179 | 138 | 223 |
| 38 | 26 | 14.3 | 14.8 | 171 | 187 | 138 | 223 |
| 39 | 52 | 13.4 | 13.0 | 188 | 182 | 139 | 222 |
| 40 | 39 | 13.2 | 14.7 | 88 | 73 | 139 | 223 |
| 41 | 43 | 15.3 | 14.3 | 81 | 96 | 138 | 223 |
| 42 | 48 | 13.1 | 13.5 | 82 | 107 | 138 | 222 |
| 43 | 41 | 16.3 | 13.2 | 143 | 237 | 135 | 224 |
| 44 | 45 | 15.5 | 13.7 | 158 | 244 | 137 | 222 |
| 45 | 50 | 15.1 | 13.2 | 138 | 257 | 137 | 224 |

TABLE 9

| Ex. No. | Porosity (%) | Strength (kg/mm$^2$) MD | Elongation (%) | | Melting Temp. (° C.) | |
|---|---|---|---|---|---|---|
| | | | PE-2 | PE-3 | PE-4 | 1$^{st}$ | 2$^{nd}$ |
| 10 | 39 | 11.2 | 10.8 | 153 | 162 | 139 | — |
| 11 | 35 | 10.1 | 11.1 | 69 | 70 | 138 | — |
| 12 | 38 | 13.3 | 10.5 | 138 | 230 | 136 | — |

As is apparent from Tables 7-9, the microporous films having a laminated structure comprising B layer/A layer/B layer, prepared in Examples 28~45, had mechanical properties of strength and elongation superior to microporous films of Comparative Examples 10~12 having a monolayer structure and same thicknesses.

In addition, the polyethylene microporous films having a laminated structure comprising B layer/A layer/B layer, prepared in Examples 28~45, had higher porosity than the polyethylene microporous films prepared in Comparative Examples 10~12.

This is because polyester or nylon 6, incompatible with polyethylene, is selectively used in Examples 28~45. Thereby, pores can be formed not only through a typical pore formation process but also through additional pore formation during a stretching process due to the incompatible resin, therefore resulting in increased porosity.

Further, the polyethylene microporous film having a laminated structure comprising B layer/A layer/B layer, prepared using the thermoplastic resin having a melting temperature higher than that of the polyethylene in Examples 28~45, has a first melting temperature of 125~145° C. and a second melting temperature of 175~235° C., and thus can be confirmed to have high-temperature stability. Hence, the polyethylene microporous film of the present invention does not melt upon overheating, and can delay the occurrence of short circuits.

As described above, the present invention provides a polyethylene microporous film for a rechargeable battery separator and a method of preparing the same. According to a first embodiment and a second embodiment of the present invention, a polyethylene and an aliphatic hydrocarbon solvent are melt-mixed to separately form an A layer and a B layer having different porosities, after which the A and B layers are coextruded, thus preparing a. polyethylene microporous film for a rechargeable battery separator having a laminated structure comprising B layer/A layer/B layer.

Since the polyethylene microporous film thus prepared has a laminated structure, it has mechanical properties, such as strength and elongation, superior to a film having a monolayer structure. In particular, the polyethylene microporous film, according to the second embodiment, comprises an A layer further including a thermoplastic resin having a melting temperature higher than that of the polyethylene, in which the thermoplastic resin functions to form pores during a stretching process, thus increasing the porosity thereof and exhibiting high-temperature stability.

In addition, the method of preparing the polyethylene microporous film of the present invention is advantageous because process stability is exhibited upon preparation of a microporous film, and thin film articles can be produced.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of preparing a polyethylene microporous film for a rechargeable battery separator comprising the steps of:
    melt-mixing 20 to about 40 wt % of a polyethylene with 60 to about 80 wt % of an aliphatic hydrocarbon solvent at an extrusion temperature of 160-220° C. and a screw rotation rate of 150-250 rpm using a first intermeshing corotating twin-screw extruder to form an A layer, which is 1 to about 8 μm thick and has a porosity ranging from about 33 to 55%;
    melt-mixing 45 to about 65 wt % of a polyethylene with 35 to about 55 wt % of an aliphatic hydrocarbon solvent at an extrusion temperature of 160-220° C. and a screw rotation rate of 150-250 rpm using a second intermeshing corotating twin-screw extruder to form B layers, and each B layer is 1 to about 4 μm thick and has a porosity ranging from about 23 to 41%;
    coextruding the A layer and B layers to laminate B layers on both surfaces of the A layer, and then cooling the coextruded layers, to form a gel composition having a laminated structure comprising B layer/A layer/B layer, the laminated structure having an overall porosity ranging from about 28 to about 46% with the A layer having a greater thickness and a higher porosity that either of the B layers, and the laminated structure has a thickness of 3 to about 16 μm;
    biaxially stretching the gel composition, to prepare a film;
    extracting the aliphatic hydrocarbon solvent from the A layer and B layers of the film using an organic solvent to remove the aliphatic hydrocarbon solvent, to prepare a microporous film; and
    heat-treating the microporous film at a temperature not greater than a melting temperature of the polyethylene.

2. The method as set forth in claim 1, wherein the biaxial stretching is conducted at a ratio ranging from 4×4 to 8×8 at 105 to about 125° C.

3. A method of preparing a polyethylene microporous film for a rechargeable battery separator comprising the steps of:
    melt-mixing with 12.8 to about 64.9 wt % of a polyethylene, 0.1 to about 7.2 wt % of a thermoplastic resin incompatible with the polyethylene and having a melting temperature higher than that of the polyethylene, and 35 to about 80 wt % of an aliphatic hydrocarbon solvent at an extrusion temperature of 180-280° C. and a screw rotation rate of 100-300 rpm using a first intermeshing corotating twin-screw extruder to form an A layer, which is 1 to about 8 μm thick and has a porosity ranging from about 33 to 55%,
    melt-mixing 20 to about 65 wt % of a polyethylene with 35 to about 80 wt % of an aliphatic hydrocarbon solvent at an extrusion temperature of 180-280° C. and a screw rotation rate of 100-300 rpm using a second intermeshing corotating twin-screw extruder to form B layers, and each B layer is 1 to about 4 μm thick and has a porosity ranging from about 23 to 41%;
    coextruding the A layer and B layers to laminate B layers on both surfaces of the A layer, and then cooling the coextruded layers, to form a gel composition having a laminated structure comprising B layer/A layer/B layer, the laminated structure having an overall porosity ranging from about 28 to 46% with the A layer having a greater thickness and a higher porosity than either of the B layers, and the laminated structure having a thickness of 3 to about 16 μm;
    biaxially stretching the gel composition, to prepare a film;
    extracting the aliphatic hydrocarbon solvent from the A layer and B layers of the film using an organic solvent to remove the aliphatic hydrocarbon solvent, to prepare a microporous film; and
    heat-treating the microporous film at a temperature not greater than a melting temperature of the polyethylene.

4. The method as set forth in claim 3, wherein the biaxial stretching is conducted at a ratio ranging from 4×4 to 8×8 at 105 to about 125° C.

5. The method as set forth in claim 1, wherein the thickness of the A layer is substantially the same as the combined thickness of the B layers.

6. The method as set forth in claim 3, wherein the thickness of the A layer is substantially the same as the combined thickness of the B layers.

* * * * *